(12) United States Patent
Armentrout et al.

(10) Patent No.: US 7,666,682 B2
(45) Date of Patent: Feb. 23, 2010

(54) MARKING SYSTEM

(75) Inventors: Douglas B. Armentrout, Purcellville, VA (US); Thomas R. Boyer, Gambrills, MD (US)

(73) Assignee: Immediate Response Technologies, Inc., Glenn Dale, MD (US)

( * ) Notice: Subject to any disclaimer, the term of this patent is extended or adjusted under 35 U.S.C. 154(b) by 794 days.

(21) Appl. No.: 10/970,797

(22) Filed: Oct. 21, 2004

(65) Prior Publication Data

US 2005/0084975 A1    Apr. 21, 2005

Related U.S. Application Data

(60) Provisional application No. 60/513,090, filed on Oct. 21, 2003, provisional application No. 60/551,927, filed on Mar. 10, 2004.

(51) Int. Cl.
    *G01N 37/00* (2006.01)
(52) U.S. Cl. .................. 436/56; 250/336.1; 250/338.1; 250/339.01; 250/339.06
(58) Field of Classification Search .................. 436/56, 436/57; 250/504 R, 336.1, 338.1, 339.01, 250/339.06; 362/470
    See application file for complete search history.

(56) References Cited

U.S. PATENT DOCUMENTS

| | | | |
|---|---|---|---|
| 4,422,646 A * | 12/1983 | Rosa | 273/348.1 |
| 4,546,983 A | 10/1985 | Rosa | 273/348.1 |
| 4,659,089 A | 4/1987 | Rosa | 273/348.1 |
| 5,326,265 A | 7/1994 | Prevou | 434/11 |
| 5,438,404 A | 8/1995 | Hamilton et al. | 356/152.2 |
| 5,567,950 A | 10/1996 | Meeker et al. | 250/504 R |
| 5,619,323 A | 4/1997 | Hamilton et al. | 356/139.03 |
| 6,244,011 B1 | 6/2001 | Esser | 52/646 |
| 6,567,248 B1 | 5/2003 | Schmidt et al. | 360/470 |
| 6,768,126 B2 | 7/2004 | Novak et al. | 250/504 R |

* cited by examiner

*Primary Examiner*—Walter D Griffin
*Assistant Examiner*—Christine T Mui
(74) *Attorney, Agent, or Firm*—Duane Morris LLP

(57) ABSTRACT

A marking system that allows remote observations of visual and infrared electromagnetic signatures emitted from a distinctive marker panel. A kit employing such panels is particularly suitable for military environments, which, in turn, enhances the survivability of military equipment. The marking system preferably provides a signature in the mid and far infrared and near infrared portions of the electromagnetic spectrum, such that the electromagnetic radiation can be observed by a pilot in an approaching moving object such as a plane, helicopter, or land vehicle that is equipped with a thermal imaging system or light intensifier device, even in adverse environmental conditions. In varying embodiments, the marking system may be used as a landing marker, a bore sight panel, and an identification panel. Utilization of passive infrared material enables use of such marking system when external power is unavailable.

56 Claims, 9 Drawing Sheets

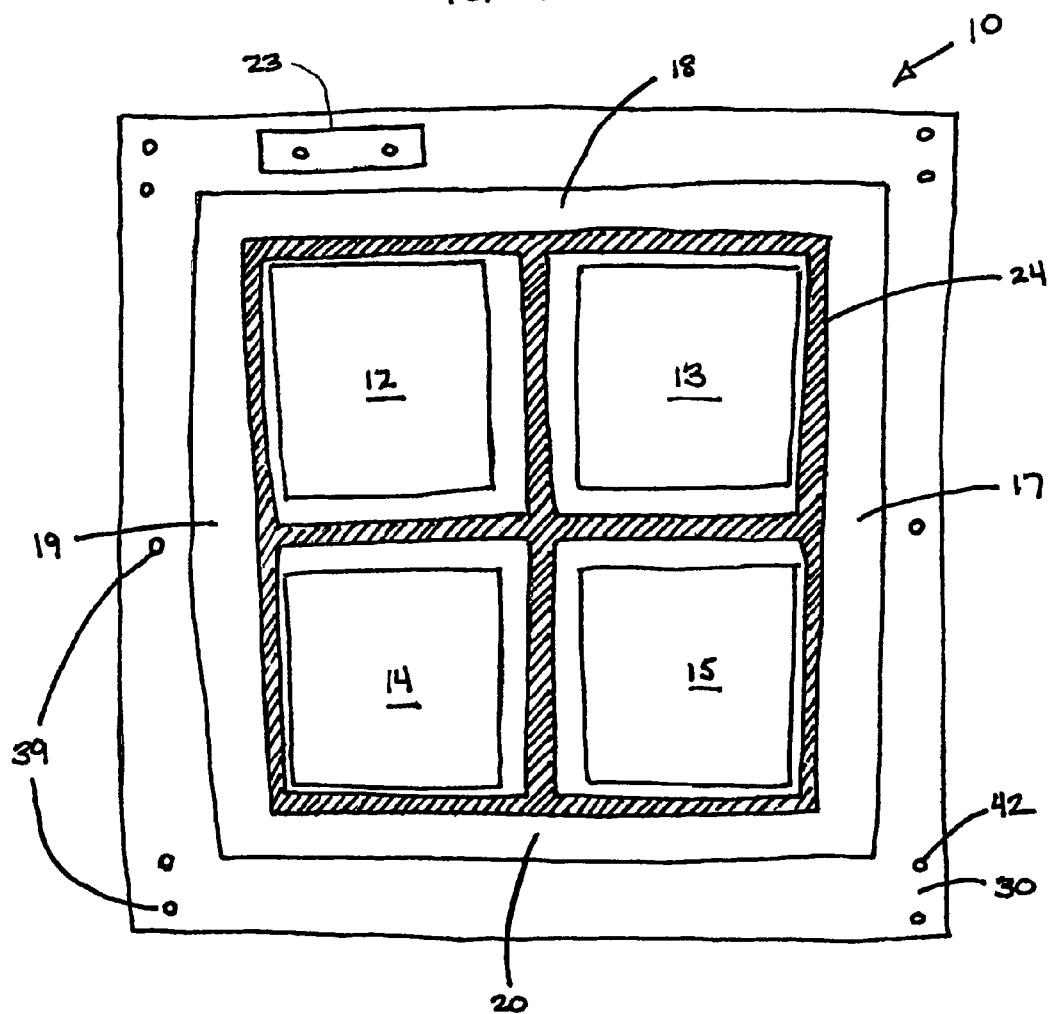

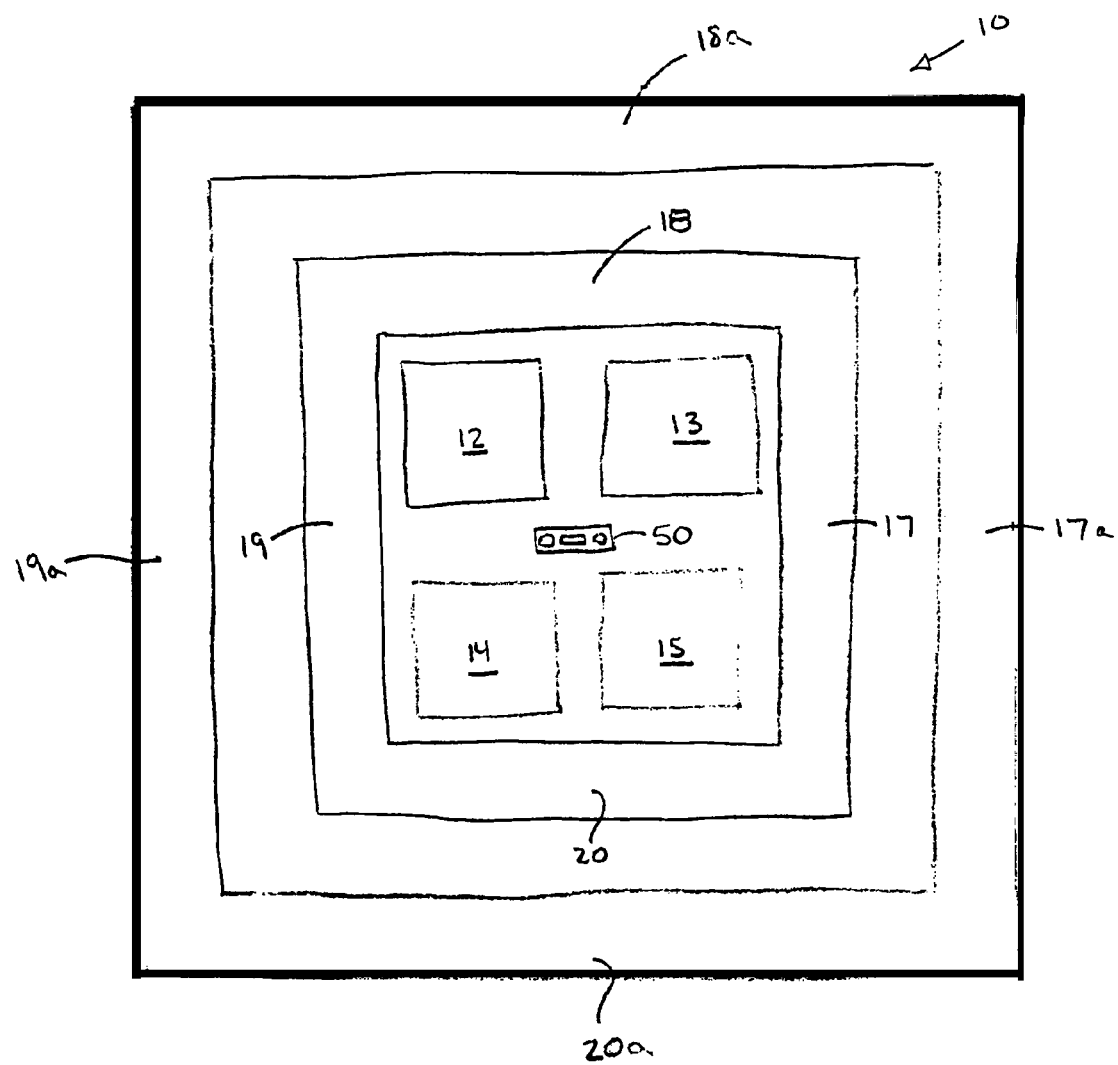

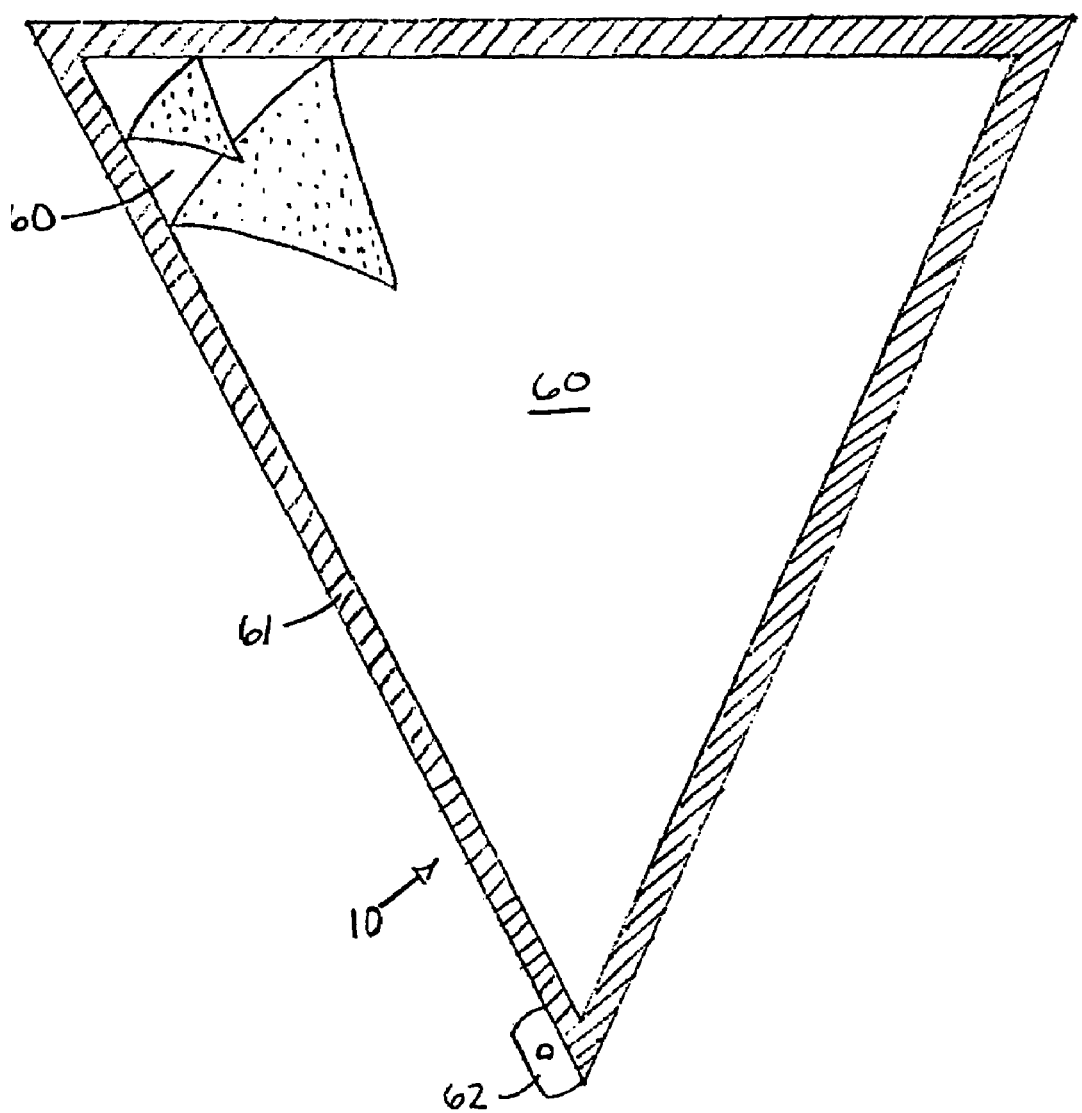

MARKING SYSTEM

CROSS REFERENCE TO RELATED APPLICATION

This application is based upon and claims benefit of copending and co-owned U.S. Provisional Patent Application Ser. No. 60/513,090 entitled "Marking System," filed with the U.S. Patent and Trademark Office on Oct. 21, 2003 by the inventors herein, and copending and co-owned U.S. Provisional Patent Application Ser. No. 60/551,927 entitled "Marking System," filed with the U.S. Patent and Trademark Office on Mar. 10, 2004, the specifications of which are incorporated herein by reference.

BACKGROUND OF THE INVENTION

1. Field of the Invention

This invention relates generally to marking systems for enabling sight and identification of distant geographic locations or items of interest, and more particularly to a marking system having multiple regions of active and/or passive constructions independently observable by artificial vision enhancing devices and optionally the unaided human eye.

2. Background of the Prior Art

Observation of subjects for any purpose, whether personnel, vehicles, or other objects, presents a challenge in conditions of limited visibility. When attempting to locate, target, or otherwise observe a subject in darkness, it is necessary to provide some mechanism or process by which light or infrared may be detected so that the subject may be observed. The same need exists in conditions of fog, smoke, smog, dust, or any other environmental conditions that limit visibility.

One such difficulty is presented when landing an aircraft at a remote location, which process generally requires some marking on the ground to aid the pilot in safely setting the aircraft down. In unmarked locations, pilots are often forced to use as reference points a random sampling of objects that happen to be available to them. Any reference point must be easily identifiable and seen by the naked eye or through the current generation of viewing aids, comprised of a number of magnification spotting systems, mid and far infrared imagers, and light intensifying devices. If the landing occurs at night or the field of direct vision is occluded by smoke, dust or other opaque material, landing markers can typically only be identified by heat signature through thermal imagers or light intensifying devices, if available.

Conventional markers have included active or passive devices used for indicating safe demarcation areas for either military or commercial activities. The passive markers are typically visual cue devices that are manually placed. They include flags or other artificial visual land monuments. Another type of marker is an active device that operates with an auxiliary power source that is used for activation of a visual marker. Problems associated with these earlier marker devices when considering a military application include: i) their reliance on only visual indication of a marked area; ii) their lack of durability and portability; iii) their reliance on an auxiliary power source; and, iv) their limited operational capability due to the necessary fact that they function only under conditions when visible observation is possible.

U.S. Pat. No. 5,326,265 by Prevou entitled "Battlefield Reference Marking System Signal Device" discloses a flexible tarp with grommet construction that includes an infrared reflective marking on the tarp for demarking battlefield reference points.

U.S. Pat. No. 5,567,950 by Meeker et al. entitled "Bispectral Lane Marker" discloses a rigid, dihedral shaped device that uses low infrared emissivity to mark a location for a thermal imaging device.

U.S. Pat. No. 6,567,248 by Schmidt et al. entitled "Tri-Spectrum Aircraft Landing Light" discloses a light assembly that provides powered visible light, infrared light, and FLIR emission modes.

None of the aforementioned devices provides a marking system effective in sufficiently broad portions of the electromagnetic spectrum (e.g., mid, far, and near infrared regions) and in sufficient modes of operation to provide their operator with sufficient flexibility to meet specific marking needs in varying conditions.

Another difficulty is presented when attempting to calibrate separate vision enhancing systems or devices in their operational environment in environmental conditions that limit visibility. In this case, a single marker may be placed and viewed through the separate vision enhancing systems or devices, and those systems or devices may be independently calibrated to that marker. For instance, targeting systems may comprise a laser range finder/designator in conjunction with a visible light optical camera (a "DTV" or "DVO") and a separate Forward-Looking Infrared ("FLIR") camera. For nighttime operation, targeting is performed with the FLIR, while the laser range finder/designator (which is separate from the FLIR) is used to guide a missile to its target. For proper nighttime operation, it is important that the laser range finder/designator and FLIR be calibrated together precisely so that when the targeting FLIR is on a target, the operator knows that the laser designator is also on the target. To ensure proper calibration, bore sighting panels have been provided comprised of a brightly colored square surrounded by and itself surrounding squares of low emissivity, high reflectivity infrared material that are distinguishable with a FLIR from the brightly colored square. In use, the aircraft crew will first focus their DTV on the center of the panel, and thereafter focus their targeting FLIR on the center of the panel. Of course, such solution has limited usefulness at night or in adverse weather conditions where the operator does not have a clear view of the bore-sighting panel. At times, such panels have been provided with a light in the center of the panel to enable nighttime focusing of both the DTV and the FLIR. However, such assembly assumes that the laser designator of the system remains calibrated with the DTV, and does not enhance the ability of the FLIR to focus on the bore-sighting panel. What is required, therefore, is a marker that would enable viewing in adverse environmental conditions to confirm calibration of all elements of such a targeting system, including the DTV, FLIR, and laser range finder/designator.

Yet another difficulty is presented when attempting to identify and monitor movement and/or position of subjects at night or in adverse environmental conditions. For example, when attempting to identify or track a ground-based vehicle from the air, particularly in an area with multiple ground-based vehicles, distinguishing the particular vehicle of interest may be difficult, particularly in adverse environmental conditions. Markers have been provided consisting of panels made from very bright colors useful for identification in well-lit, unobscured environmental conditions; low emissivity, high IR reflectivity material visible when being viewed through a FLIR; and near infrared (NIR) LED's, NIR reflective tape, and NIR chem-lights viewable through night vision goggles. However, such markers have been of limited utility due to their limitation to a single viewing platform (i.e., visible light, FLIR, or night vision goggles). Moreover, while prior known low emissivity, high IR reflectivity surfaces have provided good viewing sources through FLIR equipment when new, their prolonged use causes wear of the low emissivity material, in turn providing a very limited life span. What is required, therefore, is a marking system capable of viewing in adverse environmental conditions by multiple vision enhancing equipment platforms, and preferably which provides lasting, and even more preferably a renewable, source of low emissivity, high reflectivity material.

In summary, lacking in the prior art is a sufficiently flexible and secure marking system viewable in all environmental conditions, day or night, by combining marking surfaces independently observable in different segments of the electromagnetic spectrum, such as mid and far infrared, near-infrared, and visual markers, in a single marking system effective in different segments of the electromagnetic spectrum in powered and/or non-powered operational modes.

SUMMARY OF THE INVENTION

The present invention provides a marking system that provides a flexible, secure, durable, and inexpensive marker system that allows for remote observations of signatures in multiple segments of the electromagnetic spectrum, such as visual, mid and far infrared, and near infrared electromagnetic signatures, through a plurality of active and/or passive marking devices. The rugged and durable construction of the markers permits their flexible deployment by manual placement.

In a first aspect of a preferred embodiment, the marking system comprises a panel lacking visible light emitting elements and having a plurality of non-visible light emitting elements, preferably infrared emitting elements, wherein at least one of said elements is a passive infrared element. As used herein, a "passive infrared element" is intended to mean a fabric, sheet, material, coating, or like structure observable with equipment capable of viewing near infrared and/or mid and far infrared emissions without the application of energy to such structure, i.e., that is reflective of infrared energy. Likewise, an "active infrared element" is intended to mean a fabric, sheet, material, coating, or like structure observable with equipment capable of viewing near infrared and/or mid and far infrared emissions when energy is applied to such structure. The application of energy referred to may be electrical energy in the form of, for example, direct current or alternating current, chemical energy, thermal energy, or any other active energy generation mechanism that powers the emitter to actively emit infrared emissions without actively emitting visible light emissions.

In another aspect of a preferred embodiment, the marking system comprises a panel having a plurality of passive non-visible light emitting elements, preferably passive infrared elements viewable with imaging devices operable to view emissions in distinct regions of the infrared spectrum, and more particularly in the near and the mid/far regions of the infrared spectrum.

In yet another aspect of a preferred embodiment, the marking system comprises a panel combining low power mid and far infrared emitters, passive mid and far infrared material, active near infrared emitters, and/or passive near infrared reflective material configured on said panel such that the panel can be viewed by a pilot or operator in an approaching moving object, such as a plane, helicopter, or land vehicle in adverse environmental conditions (e.g., darkness, fog, smoke, smog, dust, etc.) whether such moving object is equipped with a thermal imaging device or a light enhancement device.

In a first particularly preferred embodiment, the marking system comprises an identification panel suitable for use as a landing marker preferably combining a low power mid and far infrared emitter, passive mid and far infrared material, an active near infrared emitter, and passive near infrared reflective material such that the marker can be viewed by a pilot or operator in adverse environmental conditions in an approaching moving object equipped with a thermal imaging device or light enhancement device.

In a second particularly preferred embodiment, the marking system comprises a bore sight panel suitable for calibrating a FLIR, DTV, and laser range finder/designator preferably combining low power mid and far infrared emitters, passive mid and far infrared material, and active near infrared emitters, preferably with laser sensitivity, such that the marker can be viewed by a pilot or operator in adverse environmental conditions in an object equipped with a FLIR, DTV, and target designator, or for aligning the axis of the bore of a gun with thermal sights.

In yet a third particularly preferred embodiment, the marking system comprises a vehicle identification panel suitable for use in identifying a ground-based vehicle from an airborne or other vehicle, preferably combining a replenishable source of passive mid and far infrared material, passive near infrared reflective material, and optionally active near infrared emitters, in predefined patterns such that the marker can be viewed by a pilot or operator in adverse environmental conditions in an object equipped with a thermal imaging device or light enhancement device to identify a particular ground-based vehicle among a plurality of ground-based vehicles.

It is, therefore, an object of the present invention to provide a marking system including markers allowing remote observation and detection of signatures in multiple segments of the electromagnetic spectrum, such as mid and far infrared detection and near infrared detection.

In the first particularly preferred embodiment set forth herein, the marking system is particularly useful in landing aircraft in adverse or favorable environmental conditions irrespective of the navigating tools being used by the pilot. Tools may include thermal imagers, night vision goggles or other light intensifiers, and normal vision. Previously, only thermal markers were used that would not be effective for night vision goggles or normal vision. Other previous art utilize near infrared markers only or visible light markers that were not effective for thermal imagers.

The landing zone marking system described herein includes a man-portable kit preferably containing a selection of markers that can be deployed to aid in landing, signaling, and providing direction to aircraft, particularly helicopters, in all light, weather, and environmental conditions, including full daylight, total darkness, and through dust, smoke, and fog.

In the second particularly preferred embodiment set forth herein, the marking system is particularly useful in calibrating airborne or ground weapons guidance systems in adverse or favorable environmental conditions, such systems being viewable through vision enhancing devices that are operational in distinct portions of the electromagnetic spectrum. More preferably, the marking system is preferably viewable through thermal imagers, and is likewise responsive to a laser designator, to enable the calibration of the ground or airborne vehicle's FLIR, DTV, and laser range finder/designator from a ground-based source even in adverse environmental conditions, or to align the bore of a gun with a sighting device.

Further, in the third particularly preferred embodiment set forth herein, the marking system is particularly useful in identifying one or more particular vehicles from among a larger group of vehicles in adverse or favorable environmental conditions, such system comprising material configured in a predetermined pattern, such as a letter, number, combination of letters and numbers, or other symbols or indicia viewable through vision enhancing devices that are operational in distinct portions of the electromagnetic spectrum, preferably at least through thermal imagers and night vision goggles. Moreover, such system preferably provides a renewable or replenishable source of material for at least one of the materials comprising the marking system so as to increase its useful life.

The marking system of the instant invention thus preferably enables operation over a wide electromagnetic spectrum, and is suitable for use with multiple image enhancing navigating aids. Further, the marking system of the instant invention preferably includes rugged, durable, man-portable markers for use in all environmental conditions.

BRIEF DESCRIPTION OF THE DRAWINGS

The above and other features, aspects, and advantages of the present invention are considered in more detail, in relation to the following description of embodiments thereof shown in the accompanying drawings, in which:

FIG. 2 shows an illustration of a marker device according to one embodiment of the present invention;

FIG. 6 shows an illustration of a marker device according to a second embodiment of the present invention; and FIG. 7 shows an illustration of a marker device according to a third embodiment of the present invention.

DETAILED DESCRIPTION OF THE INVENTION

The invention summarized above and defined by the enumerated claims may be better understood by referring to the following description, which should be read in conjunction with the accompanying drawings in which like reference numbers are used for like parts. This description of an embodiment, set out below to enable one to build and use an implementation of the invention, is not intended to limit the enumerated claims, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
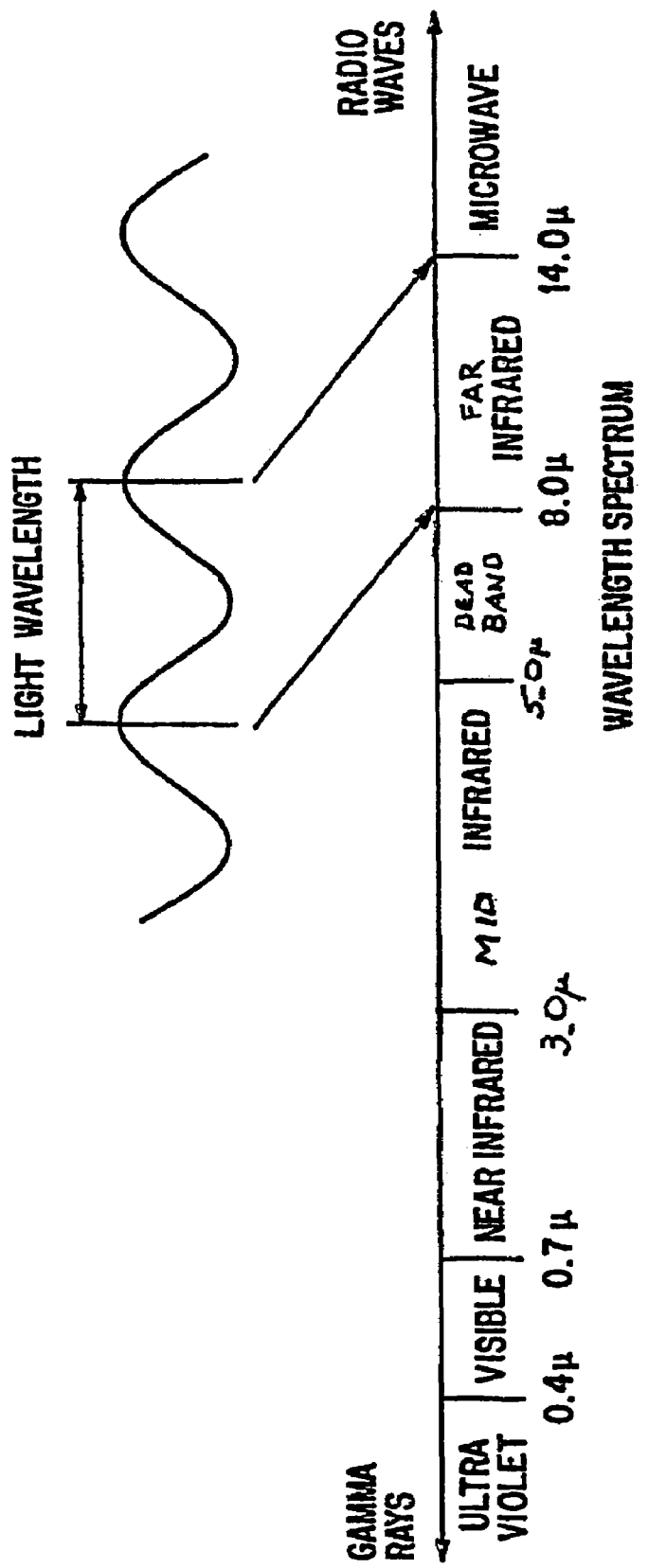
FIG. 1 shows an illustration of the electromagnetic spectrum.

Referring to FIG. 1, the wavelength of an electromagnetic wave is the characteristic length of a complete cycle of the wave going from a crest through a trough back to a crest. Electromagnetic wavelengths range in length from kilometers for radio waves through centimeters for microwaves down to nanometers and less for x-rays and gamma rays. This extremely wide range of wavelengths is referred to as the electromagnetic spectrum. The entire electromagnetic spectrum includes gamma rays, x-rays, ultraviolet radiation, visible light, infrared radiation, microwaves, and more. Each band is differentiated by its wavelength. Waves visible to the human eye range from violet to red at about 0.4 through 0.7 microns.

Infrared light is a portion of the overall electromagnetic spectrum and lies between the visible and microwave portions of the electromagnetic spectrum. Infrared light has a range of wavelengths including wavelengths from about 0.7 microns to about 14 microns. The infrared spectrum is usually divided into 3 spectral regions: near, mid and far infrared. The boundaries between the near, mid and far-infrared regions can vary. The main factor that determines which wavelengths are included in each of these three infrared regions is the type of detector technology used for gathering infrared. Near infrared spans from about 0.7 microns to about 3 microns. Mid-infrared spans from about 3 microns to about 8 microns, although the range from about 5 microns to about 8 microns is sometimes referred to as a dead band, since atmospheric absorption of the electromagnetic energy is relatively high in this region and few detectors operate in this band. Far infrared spans from about 8 microns to about 14 microns.

The wavelength interval used by many infrared detectors is in the 8-14 micron band of the spectrum. This is a good wavelength band because most objects of normal terrestrial temperatures radiate the largest portion of their energy here, and because atmospheric absorption of the electromagnetic energy is low relative to other regions of the spectrum.

Thermal imaging systems that are used in ground vehicles and aircraft operate by presenting a picture of the probable temperature of objects in their field-of view. When a thermal imager is operating in the "white hot" mode, lower temperature objects are generally represented by dark areas and higher temperatures by white areas, which is analogous to a black-and-white television picture. Thermal imaging devices and other non-contact infrared thermometers measure object temperatures by analysis of the electromagnetic energy radiated from an object in a specific wavelength interval. In general, infrared image detectors operate well in one of the infrared bands; either the mid-infrared band or the far infrared band but not both. This is a function of the different detector technologies that are sensitive to energy at particular wavelengths.

Light intensifiers, such as night vision goggles, are sensitive to electromagnetic radiation in the near infrared and visible light bands. If there is no available light to amplify, then the intensifier system will not be usable unless an illuminator is used.

In a first aspect of a preferred embodiment of the invention, the marking system comprises a panel that preferably includes a plurality of infrared marking devices, wherein at least one of such infrared marking devices is a passive infrared marking device. Inclusion of such a passive infrared marking device assists the marking system to serve its intended signaling purpose whether an external power source is available or not. To increase the system's utility while ensuring operability and functionality without requiring external power, at least one passive infrared marking device may be provided that reflects infrared energy in the near infrared portion of the electromagnetic spectrum, and at least one passive infrared marking device may be provided that reflects infrared energy in the mid and far portion of the electromagnetic spectrum. To even further increase the system's utility, one or more such passive infrared marking devices may be combined with one or more active infrared marking devices to further enhance visibility when an external power source is readily available. However, where active infrared marking devices are used, they preferably exclude active visible light emitters so as to maintain security when using the marking system (e.g., so as to hinder unintended or unwanted parties from viewing the marking system), thus requiring the use of imaging or light enhancing equipment to view the system in adverse environmental conditions.

The marker system of the present invention in a first particularly preferred embodiment preferably includes the following markers:

One or more passive (non-powered) mid and far infrared marking devices that appear 'cold' when viewed through an infrared camera, FLIR, or other thermal imager;

One or more active (powered) mid and far infrared marking devices that appear 'hot' when viewed through an infrared camera, FLIR, or other thermal imager;

One or more near-infrared markers, powered and/or non-powered, that can be seen using any night vision goggles or other image (light) intensifiers; and Optionally, one or more markers made from highly visible material that can be seen by normal human vision at great distance when they are not obscured by darkness, weather, or other environmental conditions.

FIG. 2 shows an illustration of a marker panel, indicated generally as 10, employing a first particularly preferred embodiment of the marking system of the invention. Such marker panel 10 comprises a plurality of active infrared zones 12, 13, 14, 15 and a plurality of passive infrared zones 17, 18, 19, 20. The active infrared zones 12, 13, 14, 15 comprise custom-designed panels that emit mid and far infrared energy, that can be easily seen by any thermal imager. The active infrared zones comprise large area emitting elements comprising a laminate, and a power source electrically communicable with the infrared emitting element. The laminate includes an infrared emitting layer optionally having an infrared transparent cover. In one embodiment, the mid and far infrared emitting layer comprises a plastic film, such as conductive thin film, an example of which is described in U.S. Pat. No. 4,422,646, incorporated herein by reference for a description of conductive thin films. Other materials actively emitting infrared energy in the mid and far infrared ranges may also be used.

The passive infrared zones 17, 18, 19, 20 comprise "no power material" or thermally "cold" material constructed with a highly reflective backing that inherently has the characteristic of low infrared emissivity, and a highly transmissive, preferably low emissivity, coating. The material allows infrared energy to pass through the transmissive coating and be reflected off the highly reflective backing in a manner similar to light being reflected off a mirror. If the material is positioned to reflect the cold infrared from outer space, the highly reflective characteristics combined with the low infrared emissivity characteristics create a clear "cold" mark on a surface when viewed through a thermal imager. Conversely, the material can be positioned to reflect hot infrared energy and used to create a clear "hot" mark on a surface when viewed through a thermal imager. When viewed through different thermal imagers, the low emissivity, high reflectivity infrared material displays distinctive infrared signature characteristics that make such low emissivity, high reflectivity infrared material easily distinguished through such thermal imaging devices. This is accomplished by the low emissivity, high reflectivity infrared material without the use of any electrical or other power devices being attached to the passive low emissivity, high reflectivity infrared material.

Active, near infrared markers produce a distinct signature easily seen by light intensifier/night vision equipment. An active near infrared device 23 having preferably multiple LEDs for redundancy is included in the marker panel 10.

Additionally, passive near infrared material 24 may optionally be provided on panel 10 enabling viewing by light intensifier/night vision equipment. Such passive near infrared material 24 is available in tape form, for example the commercially available GLO-TAPE provided by Night Vision Equipment Company. Additionally, near-IR emitting polymer may optionally be provided on panel 10 enabling viewing by light intensifier/night vision equipment. This near-IR emitting polymer transmits near-IR along its length, the near-IR source comprising preferably multiple near-IR LEDs embedded in the polymer. Such strip polymer material is commercially available.

Figure 3:
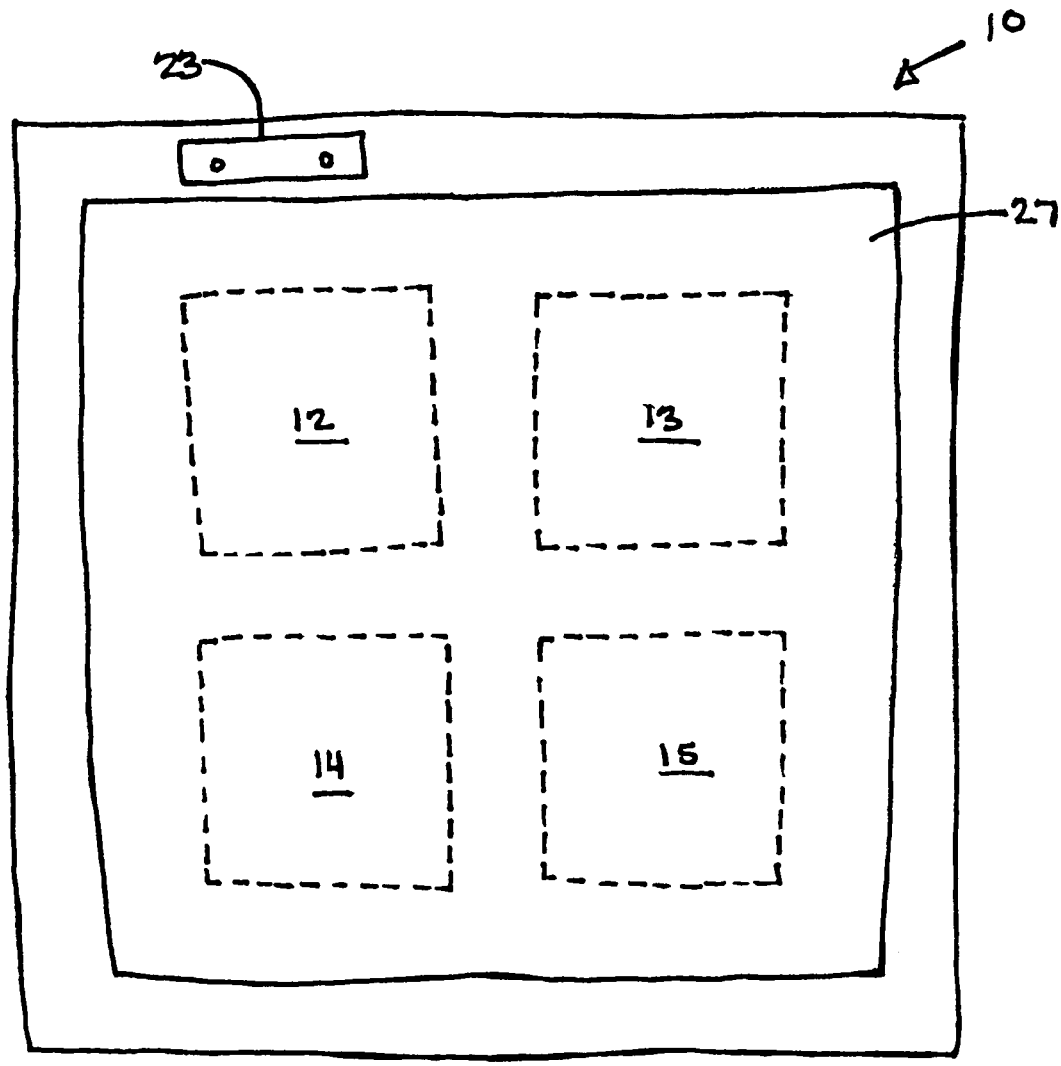
FIG. 3 shows an illustration of another modified marker device of FIG. 2.

As shown in FIG. 3, passive, international orange panels 27 produce a distinct signature easily seen by the naked eye and visible light cameras. These panels can be seen from great distances using binoculars or the naked eye. Brightly colored material, designed for maximum visibility at long distances in open terrain provides for easy discrimination of the marker panel 10 at a long distance in good environmental conditions. Panels 27 can optionally be placed over active infrared zones 12, 13, 14, or 15. Such panels 27 can be provided with appropriate fasteners, such as snaps, hook and loop fastening material, or the like, to permit removable attachment to marker panel 10. Likewise, each of the active and passive infrared devices may be removable in similar fashion from marker panel 10.

Figure 4A:
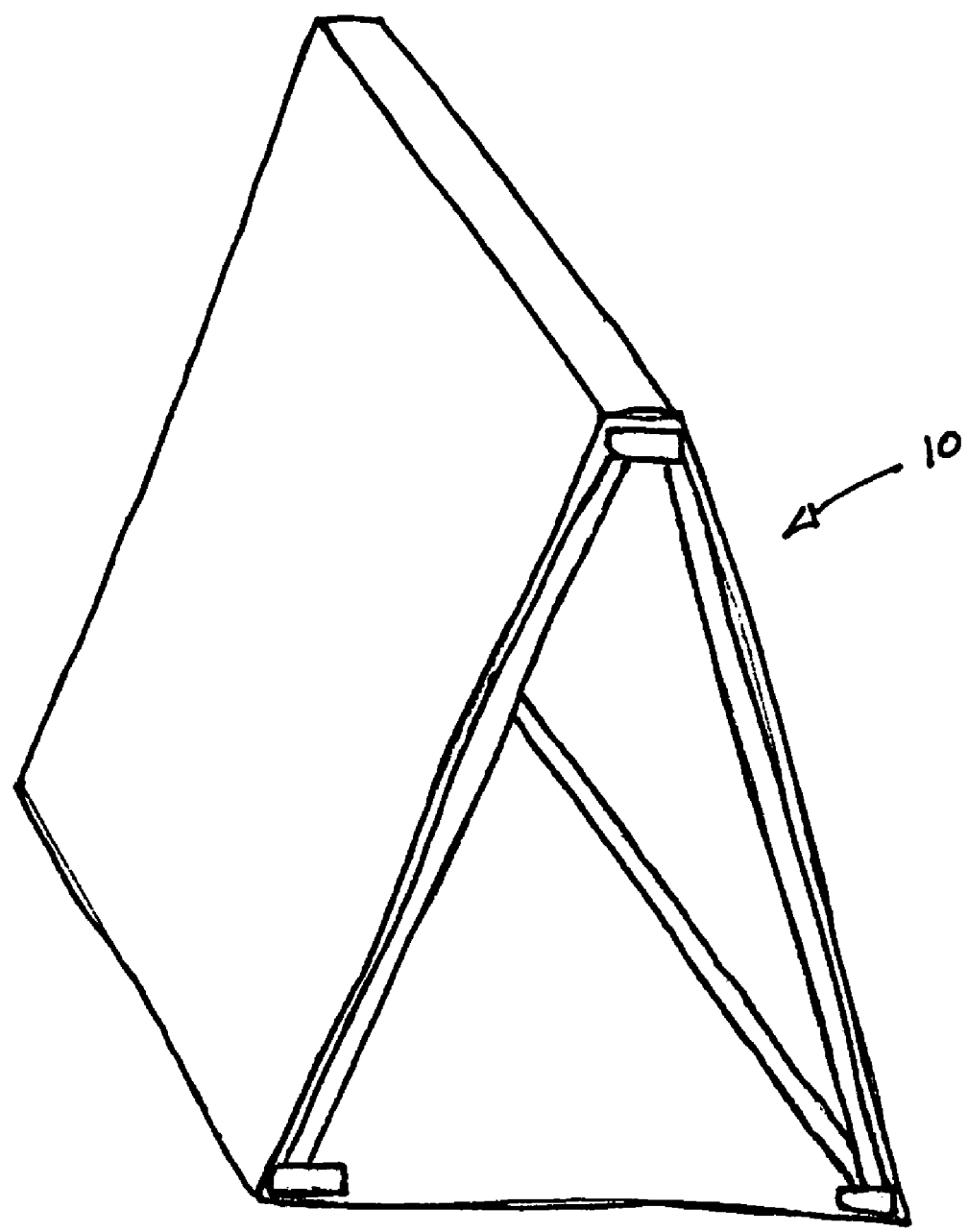
FIG. 4a shows a side perspective view of the marker in an erected position according to one embodiment of the present invention.
Figure 4B:
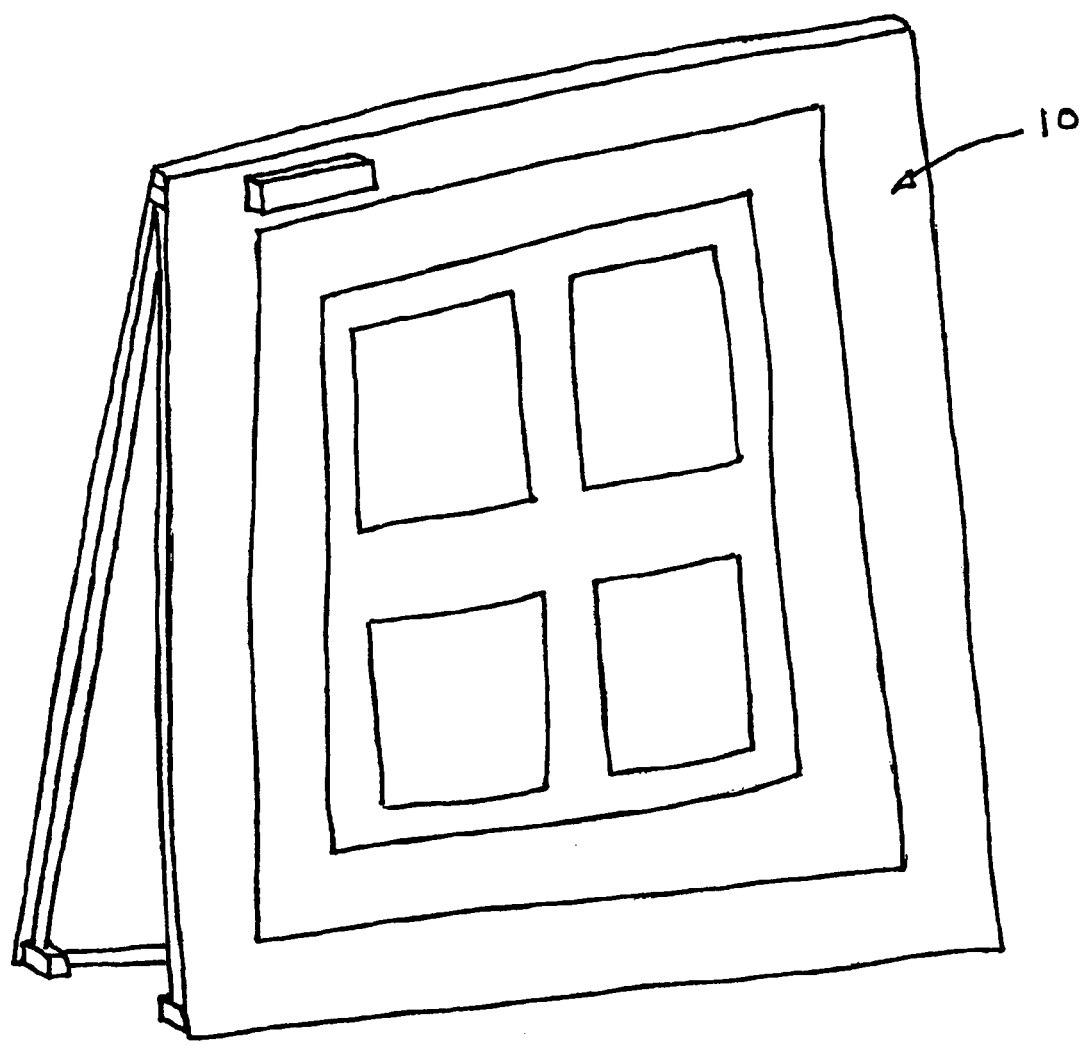
FIG. 4b shows a front perspective view of the marker in an erected position according to one embodiment of the present invention.

Marker panel 10 is constructed of rugged fabric sheet 30 that is highly resistive to mildew, water, and chemicals. For example, sheet 30 may be comprised of 1000 Denier Cordura nylon. In use, marker panel 10 can be spread on the ground, or attached to a frame enabling elevated display in a raised angle as shown in FIGS. 4a and 4b. Fasteners, such as hook and loop strips by Velcro® and side release buckles can be used to removably attach panels to quick erect platforms, vehicles, or other surfaces or locations. Additionally, marker panel 10 is preferably provided with a plurality of reinforced openings, such as 39, to fasten the marker panel 10 to the ground. Marker panel 10 may optionally fold upon itself to protect the active and passive emitter panels when not in use. In such case, marker panel 10 may also include fasteners 42, such as snaps to secure the marker panel 10 in a folded position for storage.

Figure 2A:
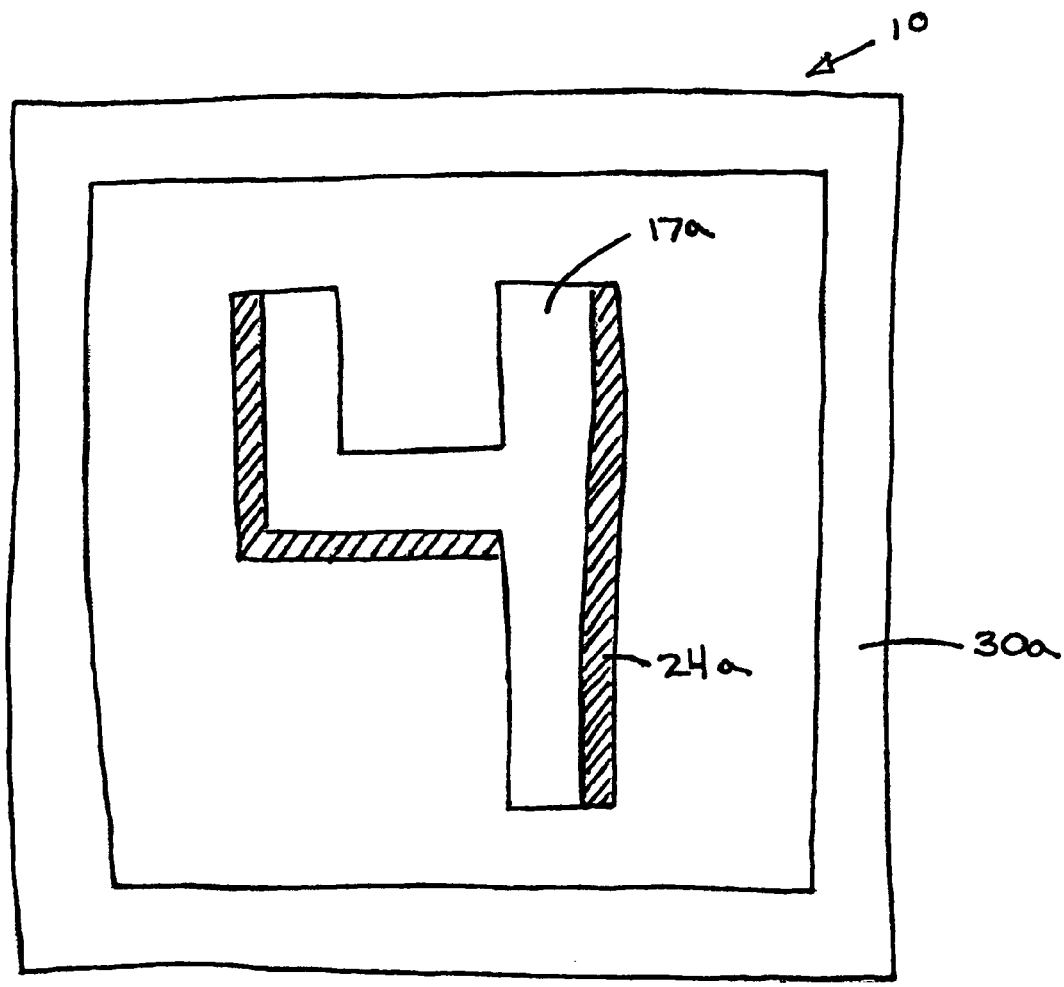
FIG. 2a shows an illustration of a modified marker device of FIG. 2.

As shown in FIG. 2a, this first particularly preferred embodiment of the marker system of the invention may alternately or additionally comprise a section of low emissivity, high reflectivity infrared material 17a formed in the shape of a letter, number, symbol, or other indicia, and attached to a backing sheet member 30a. Backing sheet member may be the same piece as sheet member 30 with a separable panel removably attached thereto and holding section of low emissivity, high reflectivity infrared material 17a (attached to one another in the same fashion in which international orange panels 27 are attached to sheets 30), or may alternately be provided as combined, integrated markers. The section of low emissivity, high reflectivity material 17a is viewable through a thermal imager to enable a pilot or other remote viewer to receive the particular message presented by the marker in adverse environmental conditions, such as by viewing the marker through a FLIR. However, the symbol is also outlined or traced with passive near infrared material 24a enabling communication of the message on the marker to such remote viewer when viewing the same through light intensifier/night vision equipment. Moreover, in place of or more preferably in addition to passive near infrared material 24a, active infrared panels identical in operation to active infrared zones 12, 13, 14, 15 of FIG. 2 may be provided in strip form to also outline or trace the symbol, again enabling communication of the message on the marker to a remote viewer when viewing the scene through light intensifier/night vision equipment or FLIR. Likewise, one or more active near infrared emitters, such as a polymer strip embedded with near-IR LEDs, may be used, aligned in strip form, in place of or in addition to passive near infrared material 24a to outline or trace the symbol.

In one embodiment, marker panel 10 can be attached to a quick erect platform for deployment as shown in FIGS. 4a and 4b, and preferably a quick erect display framework collapsible from an inverted V-shaped display framework to a compact configuration as set forth in U.S. Pat. No. 6,244,011, which is incorporated herein by reference.

A landing zone marking kit may be provided incorporating the marking system disclosed herein including a plurality of marker panels 10, a plurality of stakes/posts or quick-erect platforms for attaching the marker panel 10 to the ground, power supply for active mid and far infrared emitters and near infrared emitters, cabling and connectors for various power supplies, and one or more cases for transporting the kit.

The powered items in the kit can be activated manually, or as an option, activated via a remote control device. Such activation is preferably enabled with a switch (whether manually or remotely activated) that provides for selective activation of each active emitter individually. All of the individual items in the kit, as well as the entire kit, are preferably man portable. The kit includes all items, such as quick erect platforms or stakes, cord, cabling, connectors, and other items needed to deploy the marker panels 10.

In operation, a user can choose the configuration of markers to deploy depending on environmental conditions and the equipment available in the aircraft or other vehicle. The kit described above comprises adaptable markers that can be detected by aircraft equipped with night vision devices or other image (light) intensifiers, using infrared imagers, FLIR, and optionally using normal vision when the landing zone is not obscured by darkness, weather, or other environmental conditions.

The marking system of this first particularly preferred embodiment of the present invention may be used in the following situations:

Mark landing and pick-up zone locations in all light, weather, and environmental conditions;

Provide a point of reference for pilots landing in adverse conditions including smoke, fog, or brownouts caused by dust, dirt, or sand;

Signal to aircraft where it is safe to land, the location that a specific aircraft should land, the direction that an aircraft should land, and the path an aircraft should take when landing, taking off, or taxiing; and Mark the location where aircraft should drop bundles, personnel, or other equipment using parachutes, sling-loading, low altitude extraction systems, and other delivery methods.

Figure 5:
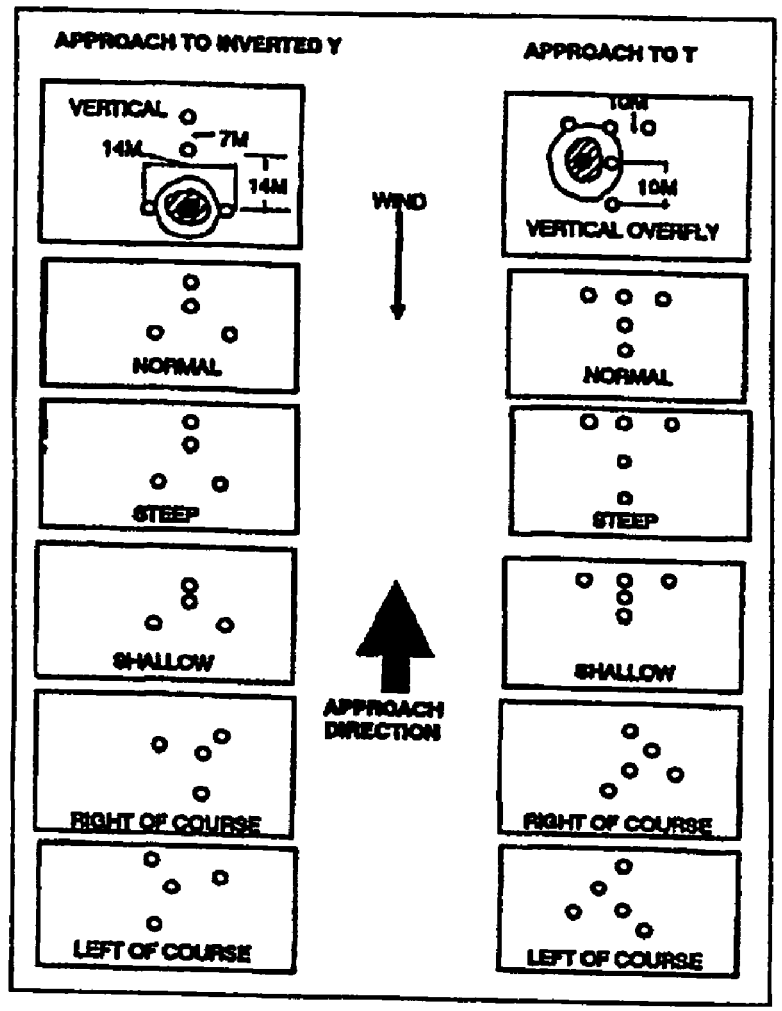
FIG. 5 shows an illustration of a plurality of marker devices according to the present invention in use.

Referring to FIG. 5, an illustration of a plurality of marker devices from the kit comprising markers according to the first particularly preferred embodiment of the invention in use shows four marker panels 10 deployed for an inverted "Y" approach or five marker panels 10 deployed for a "T" approach. Specific details for landing helicopters under various conditions can be found in Chapter 4, Helicopter Landing Zones, of the U.S. Army field manual, Pathfinder operations FM 3.21-38, which is incorporated herein by reference. However, there does not exist an adequate marking system for landing helicopters with thermal imagers. Adverse weather and lighting conditions normally require the use of thermal signature viewing devices ("thermal imagers"), or other optically assisted viewing devices. The marker panel disclosed herein uses an active mid and far infrared emitter and passive mid and far infrared reflective material, both of which appear visible through infrared imagers. When viewed through different imaging devices, the infrared reflective material displays certain polarity and heat signature characteristics that make such infrared material easily distinguished through such device. The marker panel also includes low power near infrared emitters and no power near infrared reflective material that can be viewed through image intensifier devices.

In a second particularly preferred embodiment (as shown in FIG. 6), marker panel 10 comprises a structure suitable for use as a remote calibration panel for calibrating a plurality of vision enhancing devices that are operational in distinct portions of the electromagnetic spectrum, for example, thermal imagers, night vision goggles or other light intensifiers and normal vision. Preferably, the panel is also responsive to laser light so as to enable the simultaneous calibration of a laser designator used in cooperation with such vision enhancing devices. In this embodiment, marker panel 10 is provided a plurality of active infrared zones 12, 13, 14, 15 comprising custom-designed panels that emit mid and far infrared energy that can be easily seen by any thermal imager, as with the embodiment depicted in FIG. 2. Surrounding active infrared zones 12, 13, 14, 15 is preferably an area of passive infrared zones 17, 18, 19, 20, once again comprising low emissivity, high reflectivity infrared material rendering such passive infrared zones easily distinguished through thermal imaging devices. Optionally, a second, outer region of passive infrared zones 17a, 18a, 19a, 20a may be provided outside the first region. Further, an active near infrared (and optionally visible light) emitter 50 is provided on panel 10, preferably centrally positioned on marker panel 10. Incorporated in active near infrared (and optionally visible light) emitter 50 is a sensor (e.g., a photodetector cell) responsive to laser light, such that when the sensor is struck with, for example, a laser designator, the emitter may switch on the infrared emitter (and the visible light emitter, if present).

In use, the assembly of this second particularly preferred embodiment may be used for calibrating vision-enhancing devices included in an airborne targeting system. More specifically, in one operational mode the panel may emit a visible light, thus enabling the remote viewer (e.g., a pilot) to focus their DTV on the center of the target. Alternately, the panel may emit near infrared energy enabling the remote viewer to focus night vision targeting systems on the center of the target. Once focused on the center of the target, the operator's laser range finder/designator is optionally activated. If the laser is then incident on the sensor, the photodetector sensor will sense it and cause the device to flash a predetermined finite period of time, thus signaling to the operator that their laser designator is properly calibrated to their DTV. The operator's targeting FLIR is then brought about to focus on the center of active infrared zones 12, 13, 14, and 15. When active, the panels comprising infrared zones 12, 13, 14, and 15 will be more distinctive than the concentric squares of no power, low emissivity, high reflectivity infrared material for ease of use and improved accuracy in focusing the FLIR. However, if power is not available, the concentric squares can be used for this purpose, enabling the panel to be used with or without batteries for focusing the FLIR. Optionally, powered emitter 50 may be operational to emit only radiation in the near-infrared spectrum for increased covertness. A preferred configuration of this embodiment of the panel provides both modes of operation for active emitter 50 to account for the inability of the DTV to sense the near infrared signal.

In addition to serving as a calibration tool for calibrating vision-enhancing devices included in an airborne targeting system as set forth above, the remote calibration panel may likewise be used to align the axis of the bore of a gun with a thermal sight or other sighting device for the gun in adverse environmental conditions. In the event that night vision sighting devices are to be used, passive near infrared material may be provided on the panel, in like configuration to passive near infrared material 24 shown in FIG. 2, to further provide for no-power sighting using such night vision equipment.

In still yet another particularly preferred embodiment (as shown in FIG. 7), marker panel 10 comprises a structure suitable for use as a vehicle identification panel for remotely identifying a ground-based vehicle from an airborne vehicle, or otherwise a vehicle or other object of interest from a remote point of observation, which panel preferably combines a replenishable source of passive, low emissivity, high reflectivity infrared material, passive near infrared reflective material, and optionally near infrared emitters, in predefined patterns such that the marker may be viewed by a pilot or operator in an approaching moving object equipped with a thermal imaging device or light enhancement device to identify a particular ground-based vehicle or other object from among a plurality of ground-based vehicles or other difficult to distinguish objects.

In this vehicle identification panel embodiment, the panel is preferably formed in the shape of a number, letter, symbol, or other indicia suitable as a reference to display an identification for the vehicle to which it is attached. The panel comprises a section of low emissivity, high reflectivity infrared material 60 formed (e.g., by cutting such material) into the shape of the desired indicia, and applying an adhesive to its back surface. The formed and shaped indicia are then traced with near infrared reflective material 61, or optionally with active near-infrared emitting devices. Thus, once applied, the indicia will be remotely viewable through both night vision and thermal imaging equipment. The combined low emissivity, high reflectivity infrared material 60 and near infrared material 61 is then applied to either a polymer backer (which may be released for adhesive application of the indicia to a vehicle surface), or to a magnet (for magnetic application of the indicia to a vehicle surface).

Because the composition of low emissivity, high reflectivity infrared material has previously been shown to become damaged after relatively minimal use, such material 60 is preferably provided in the form of multiple sheets stacked one atop the other and maintained in such stackable form with an adhesive or other bonding medium allowing a top layer to be manually peeled off of the remaining layers when it becomes worn, in turn providing a replenishable source of low emissivity, high reflectivity infrared material.

Optionally, the vehicle identification panel may be provided a battery operated near infrared signaling device 62 for further enhanced identification through night vision goggles or other light amplification devices.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

We claim:

1. A marking system viewable in adverse environmental conditions with light amplification or imaging devices but substantially invisible to unaided sight in adverse environmental conditions, comprising:
a marker lacking an active visible light emitting element and having a plurality of non-visible light emitting elements capable of emitting infrared energy in multiple distinct portions of the electromagnetic spectrum, a first one of said non-visible light emitting elements further comprising a passive light emitting element.

2. The marking system of claim 1, a second one of said non-visible light emitting elements further comprising a non-visible light emitting element selected from the group consisting of (i) an active infrared element capable of emitting near infrared energy, (ii) an active infrared element capable of emitting mid and far infrared energy, (iii) a passive infrared element capable of reflecting near infrared energy, and (iv) a passive infrared element capable of reflecting mid and far infrared energy.

3. The marking system of claim 1, wherein at least one of said non-visible light emitting elements is formed in the shape of a predefined indicia.

4. The marking system of claim 3, wherein a second one of said non-visible light emitting elements is positioned adjacent said at least one non-visible light emitting element so as to at least partially outline said at least one non-visible light emitting element.

5. The marking system of claim 1, said first non-visible light emitting element further comprising a flexible panel member comprised of low emissivity, high reflectivity material capable of reflecting mid and far infrared energy.

6. The marking system of claim 5, wherein said flexible panel member is removable from said marker.

7. The marking system of claim 5, further comprising an active infrared element positioned on said flexible panel member and capable of emitting mid and far infrared energy.

8. The marking system of claim 7, further comprising a passive infrared element positioned on said flexible panel member and capable of reflecting near infrared energy.

9. The marking system of claim 8, further comprising an active infrared element positioned on said flexible panel member and capable of emitting near infrared energy.

10. The marking system of claim 5, said flexible panel member being formed in the shape of a predefined indicia.

11. The marking system of claim 10, further comprising a passive infrared element positioned adjacent said flexible panel member so as to at least partially outline said panel member.

12. The marking system of claim 10, said flexible panel member further comprising multiple removable layers of low emissivity, high reflectivity material capable of reflecting mid and far infrared energy.

13. The marking system of claim 12, further comprising a passive infrared element capable of reflecting near infrared energy and positioned adjacent said flexible panel member so as to at least partially outline said flexible panel member.

14. The marking system of claim 12, further comprising an active infrared element positioned on said flexible panel member and capable of emitting near infrared energy.

15. The marking system of claim 1, said marker comprising a flexible panel having a plurality of reinforced openings extending therethrough, said reinforced openings being configured to receive an attaching member to attach said marker to a surface.

16. The marking system of claim 1, further comprising a high visibility panel removably attached to said marker.

17. The marking system of claim 1, further comprising a frame positioning a face of said marker bearing said non-visible light emitting elements at a raised angle.

18. A marking system suitable for viewing in multiple distinct segments of the infrared portion of the electromagnetic spectrum without providing power to the system, comprising:
a marker having at least a first passive infrared element capable of reflecting infrared energy in a first segment of the infrared portion of the electromagnetic spectrum, and at least a second passive infrared element capable of reflecting infrared energy in a second segment of the infrared portion of the electromagnetic spectrum.

19. The marking system of claim 18, further comprising at least one active infrared element capable of emitting infrared energy.

20. The marking system of claim 19, further comprising a plurality of active infrared elements, at least a first one of said active infrared elements being capable of emitting infrared energy in said first segment of the infrared portion of the electromagnetic spectrum, and at least a second one of said active infrared elements being capable of emitting infrared energy in said second segment of the infrared portion of the electromagnetic spectrum.

21. The marking system of claim 18, wherein at least one of said passive infrared elements is formed in the shape of a predefined indicia.

22. The marking system of claim 21, wherein at least another of said passive infrared elements is positioned adjacent said at least one of said passive infrared elements so as to at least partially outline said at least one of said passive infrared elements.

23. The marking system of claim 18, said first passive infrared element further comprising a panel member comprised of low emissivity, high reflectivity material capable of reflecting mid and far infrared energy.

24. The marking system of claim 23, wherein said panel member is removable from said marker.

25. The marking system of claim 23, further comprising an active infrared element positioned on said panel member and capable of emitting mid and far infrared energy.

26. The marking system of claim 25, wherein said second passive infrared element is positioned on said panel member and capable of reflecting near infrared energy.

27. The marking system of claim 26, further comprising an active infrared element capable of emitting near infrared energy.

28. The marking system of claim 23, said panel member being formed in the shape of a predefined indicia.

29. The marking system of claim 28, said second passive infrared element being positioned adjacent said panel member so as to at least partially outline said panel member.

30. The marking system of claim 28, said panel member further comprising multiple removable layers of low emissivity, high reflectivity material capable of reflecting mid and far infrared energy.

31. The marking system of claim 30, said second passive infrared element being positioned adjacent said panel member so as to at least partially outline said panel member.

32. The marking system of claim 30, further comprising an active infrared element capable of emitting near infrared energy.

33. The marking system of claim 18, said marker comprising a flexible panel having a plurality of reinforced openings extending therethrough, said reinforced openings being configured to receive an attaching member to attach said marker to a surface.

34. The marking system of claim 18, further comprising a high visibility panel removably attached to said marker.

35. The marking system of claim 18, further comprising a frame positioning a face of said marker bearing said infrared elements at a raised angle.

36. A marking system comprising: a marker having a plurality of infrared emitting elements, at least a first one of said infrared emitting elements further comprising a passive infrared element capable of reflecting near infrared energy, and at least a second one of said infrared emitting elements further comprising an active infrared element.

37. The marking system of claim 36, wherein said active infrared element is capable of emitting near infrared energy.

38. The marking system of claim 36, wherein said active infrared element is capable of emitting mid and far infrared energy.

39. The marking system of claim 38, further comprising an active infrared element capable of emitting near infrared energy.

40. The marking system of claim 36, further comprising a passive infrared element comprised of low emissivity, high reflectivity material capable of reflecting mid and far infrared energy.

41. A marking system comprising: a marker having a plurality of infrared emitting elements, at least one of said infrared emitting elements further comprising a passive infrared element capable of reflecting mid and far infrared energy, and at least another of said infrared emitting elements further comprising an active infrared element, wherein said active infrared element does not emit visible light.

42. The marking system of claim 41, wherein said active infrared element is capable of emitting near infrared energy.

43. The marking system of claim 41, wherein said active infrared element is capable of emitting mid and far infrared energy.

44. The marking system of claim 43, further comprising an active infrared element capable of emitting near infrared energy.

45. A marking system comprising: a marker having a plurality of infrared emitting elements, at least one of said infrared emitting elements further comprising a passive infrared element capable of reflecting infrared energy in a first segment of the infrared portion of the electromagnetic spectrum, and at least another of said infrared emitting elements further comprising an active infrared element capable of emitting infrared energy in said first segment of the infrared portion of the electromagnetic spectrum.

46. The marking system of claim 45, further comprising an active infrared element capable of emitting infrared energy in a second segment of the infrared portion of the electromagnetic spectrum.

47. The marking system of claim 46, further comprising a visible light emitting element.

48. The marking system of claim 47, further comprising a sensor in electrical communication with (i) said active infrared element capable of emitting infrared energy in said second segment of the infrared portion of the electromagnetic spectrum, and (ii) said visible light emitting element, such that when said sensor senses an activation signal, said sensor changes a mode of operation of at least one of (i) said active infrared element capable of emitting infrared energy in said second segment of the infrared portion of the electromagnetic spectrum, and (ii) said visible light emitting element.

49. The marking system of claim 48, said sensor being configured to cause at least one of (i) said active infrared element capable of emitting infrared energy in said second segment of the infrared portion of the electromagnetic spectrum, and (ii) said visible light emitting element, to flash when said sensor receives an activation signal.

50. The marking system of claim 46, further comprising a sensor in electrical communication with said active infrared element capable of emitting infrared energy in said second segment of the infrared portion of the electromagnetic spectrum, such that when said sensor senses an activation signal, said sensor changing a mode of operation of said active infrared element capable of emitting infrared energy in said second segment of the infrared portion of the electromagnetic spectrum.

51. The marking system of claim 50, said sensor being configured to cause said active infrared element capable of emitting infrared energy in said second segment of the infrared portion of the electromagnetic spectrum to flash when said sensor receives an activation signal.

52. The marking system of claim 46, said first segment of the infrared portion of the electromagnetic spectrum comprising mid and far infrared energy.

53. The marking system of claim 52, said second segment of the infrared portion of the electromagnetic spectrum comprising near infrared energy.

54. The marking system of claim 45, further comprising a passive infrared element capable of emitting infrared energy in a second segment of the infrared portion of the electromagnetic spectrum.

55. The marking system of claim 54, said first segment of the infrared portion of the electromagnetic spectrum comprising mid and far infrared energy.

56. The marking system of claim 55, said second segment of the infrared portion of the electromagnetic spectrum comprising near infrared energy.

* * * * *